(12) United States Patent
Bisdikian et al.

(10) Patent No.: US 7,725,250 B2
(45) Date of Patent: *May 25, 2010

(54) PROACTIVE MECHANISM FOR SUPPORTING THE GLOBAL MANAGEMENT OF VEHICLE TRAFFIC FLOW

(75) Inventors: Chatschik Bisdikian, Chappaqua, NY (US); Joel W. Branch, Troy, NY (US); Norman H. Cohen, Suffern, NY (US); John S. Davis, II, New York, NY (US); Maria R. Ebling, White Plains, NY (US); Daby M. Sow, North White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 976 days.

This patent is subject to a terminal disclaimer.

(21) Appl. No.: 11/488,939

(22) Filed: Jul. 18, 2006

(65) Prior Publication Data
US 2008/0019269 A1    Jan. 24, 2008

(51) Int. Cl.
G06G 7/76 (2006.01)
(52) U.S. Cl. .................................... 701/117
(58) Field of Classification Search ......... 701/117–119; 340/907; 382/104
See application file for complete search history.

(56) References Cited

U.S. PATENT DOCUMENTS

| | | | |
|---|---|---|---|
| 5,696,503 A | 12/1997 | Nasburg | |
| 5,801,943 A | 9/1998 | Nasburg | |
| 6,049,753 A | 4/2000 | Nimura | |
| 6,351,709 B2 | 2/2002 | King et al. | |
| 6,480,783 B1 | 11/2002 | Myr | |
| 6,853,915 B2 | 2/2005 | Hubschneider et al. | |
| 7,203,598 B1* | 4/2007 | Whitsell | 701/210 |
| 7,257,485 B2 | 8/2007 | Sumizawa et al. | |
| 7,419,095 B2 | 9/2008 | Yoshioka et al. | |
| 7,487,017 B1 | 2/2009 | Bell et al. | |
| 2001/0001848 A1 | 5/2001 | Oshizawa et al. | |
| 2003/0135304 A1* | 7/2003 | Sroub et al. | 701/1 |
| 2004/0140909 A1 | 7/2004 | Meadows et al. | |
| 2004/0246147 A1 | 12/2004 | Von Grabe | |
| 2005/0003802 A1 | 1/2005 | Joseph | |
| 2005/0065711 A1 | 3/2005 | Dahlgren et al. | |
| 2005/0164673 A1 | 7/2005 | Ehlers | |
| 2005/0222751 A1 | 10/2005 | Uyeki | |
| 2006/0161335 A1* | 7/2006 | Beinhaker | 701/200 |

* cited by examiner

*Primary Examiner*—Yonel Beaulieu
(74) *Attorney, Agent, or Firm*—Gibb I.P. Law Firm, LLC (57) ABSTRACT

The invention addresses the disadvantage of automated vehicle traffic management systems by providing a solution for predicting and avoiding traffic congestion before the congestion is experienced. The invention includes a decentralized mechanism for predicting congestion. An exemplary embodiment of the invention uses a system of sensors to determine current traffic flow; the sensors communicate their state to a network of servers and then an algorithm is applied to the collected data to predict traffic congestion; upon detection of congestion, signals are communicated to the system controllers to prevent the traffic congestion.

7 Claims, 7 Drawing Sheets

PROACTIVE MECHANISM FOR SUPPORTING THE GLOBAL MANAGEMENT OF VEHICLE TRAFFIC FLOW

FIELD OF THE INVENTION

The present invention generally relates to a method and system to manage vehicle traffic flow in a decentralized manner; and, more particularly, to proactive prediction of congestion in a traffic system with a technique for prevention of traffic congestion.

BACKGROUND OF THE INVENTION

Vehicle traffic management involves the policies and infrastructure used to manage vehicular traffic flow in a large-scale road system such as a roadway system associated with a municipality or a government controlled highway system. The goal of a vehicle traffic management system is to maximize traffic flow through the system while maintaining a safe environment.

Vehicle traffic management systems consist of roads that intersect and such intersections offer vehicles the opportunity to choose between several routes to their final destination. Throughout a roadway system, controllers may exist for controlling flow between routes; an exemplary embodiment of a controller may be a traffic light which repeatedly modifies its state to determine how vehicles should proceed.

Vehicle traffic management may involve manual as well as automated techniques. An exemplary embodiment of a manual vehicle traffic management system may involve human administrators that monitor traffic flow from a central location and manipulate the system's controllers in response to traffic congestion. An exemplary embodiment of an automated vehicle traffic system may involve a computer system that monitors traffic flow and uses algorithms to automatically manipulate the system's controllers in response to traffic congestion.

As populations expand and the number of vehicles on roadways continues to increase, the process of managing traffic becomes an increasingly difficult task. The disadvantage of manual vehicle management systems is that they are limited in response time by the human operators. As roadway systems grow in complexity, the human response time becomes a formidable limitation. Automated vehicle traffic management systems are not constrained by the speed limitations that manual systems face. One advantage of automated vehicle traffic management systems is that they can be implemented in a distributed manner. A distributed implementation of an automated vehicle management system can enable very fast operation.

A plethora of controllers are available for use by vehicle traffic management systems. An exemplary traffic controller is a direction routing system such as Yahoo!Maps, MapQuest, Google Maps and other online tools. The current realization of these tools is to formulate the complete route prior to the beginning of a vehicle's trip. A modification of these tools may involve incorporation of real time traffic so that the route can be iteratively updated as the trip progresses. An automated system in which real time traffic allows for iteratively updated routes offers many advantages such as quick response to encountered congestion. One key feature that such a system would not offer is a technique for preventing traffic congestion.

SUMMARY OF THE INVENTION

The invention addresses the disadvantage of automated vehicle traffic management systems by providing a solution for predicting and preventing traffic congestion before the congestion is experienced. The invention includes a decentralized mechanism for predicting congestion. An exemplary embodiment of our invention uses a system of sensors to determine current traffic flow; the sensors communicate their state to a network of servers and then an algorithm is applied to the collected data to predict traffic congestion; upon detection of congestion, signals are communicated to the system controllers to avoid the traffic congestion.

For example, in one aspect of the invention, an exemplary sensor detects the average speed of vehicles (flow rates) on each roadway path and this information is aggregated for predicting congestion. In another aspect of the invention, the system controllers are actuators within the vehicles that automatically turn at roadway intersections in response to instructions. In another aspect of the invention, an exemplary sensor detects the average speed of vehicles on each roadway path and this information is aggregated for predicting congestion.

DESCRIPTION OF THE RELATED ART

Prior to the present invention, there existed no decentralized technique for predicting vehicular traffic congestion in a vehicle traffic management system. All the following are incorporated herein by reference. In particular, US Patent Application US200502227511A1 includes no predictive components. In particular, US Patent Application US2005065711A1 includes no predictive components. In particular, U.S. Pat. No. 5,696,503 predicts location of individual vehicles but does not provide an algorithm for predicting congestion. In particular, US Patent Application US2004246147A1 includes no predictive components. In particular, US Patent Application US20050164673A1 includes no predictive components. In particular, US Patent Application US20050003802A1 includes no predictive components. In particular, US Patent Application US20040140909A1 includes no predictive components. In particular, U.S. Pat. No. 6,351,709 includes a route updating mechanism but no predictive components. In particular, U.S. Pat. No. 6,853,915 receives route information from a centralized location (as opposed to a local database) but does not include prediction. In particular, U.S. Pat. No. 6,480,783 provides multiple alternative routes but does not include prediction. In particular, US Patent Application US20010001848A1 uses historical traffic data but does not predict congestion based on current data. In particular, U.S. Pat. No. 5,801,943 includes no predictive components.

BRIEF DESCRIPTION OF THE DRAWINGS

To describe the foregoing and other exemplary purposes, aspects, and advantages, we use the following detailed description of an exemplary embodiment of the invention with reference to the drawings, in which.

DETAILED DESCRIPTION OF EXEMPLARY EMBODIMENTS OF THE INVENTION

Referring now to the drawings, and more particularly to FIGS. 1-7, we describe exemplary embodiments of the method and structures according to the present invention.

Figure 1:
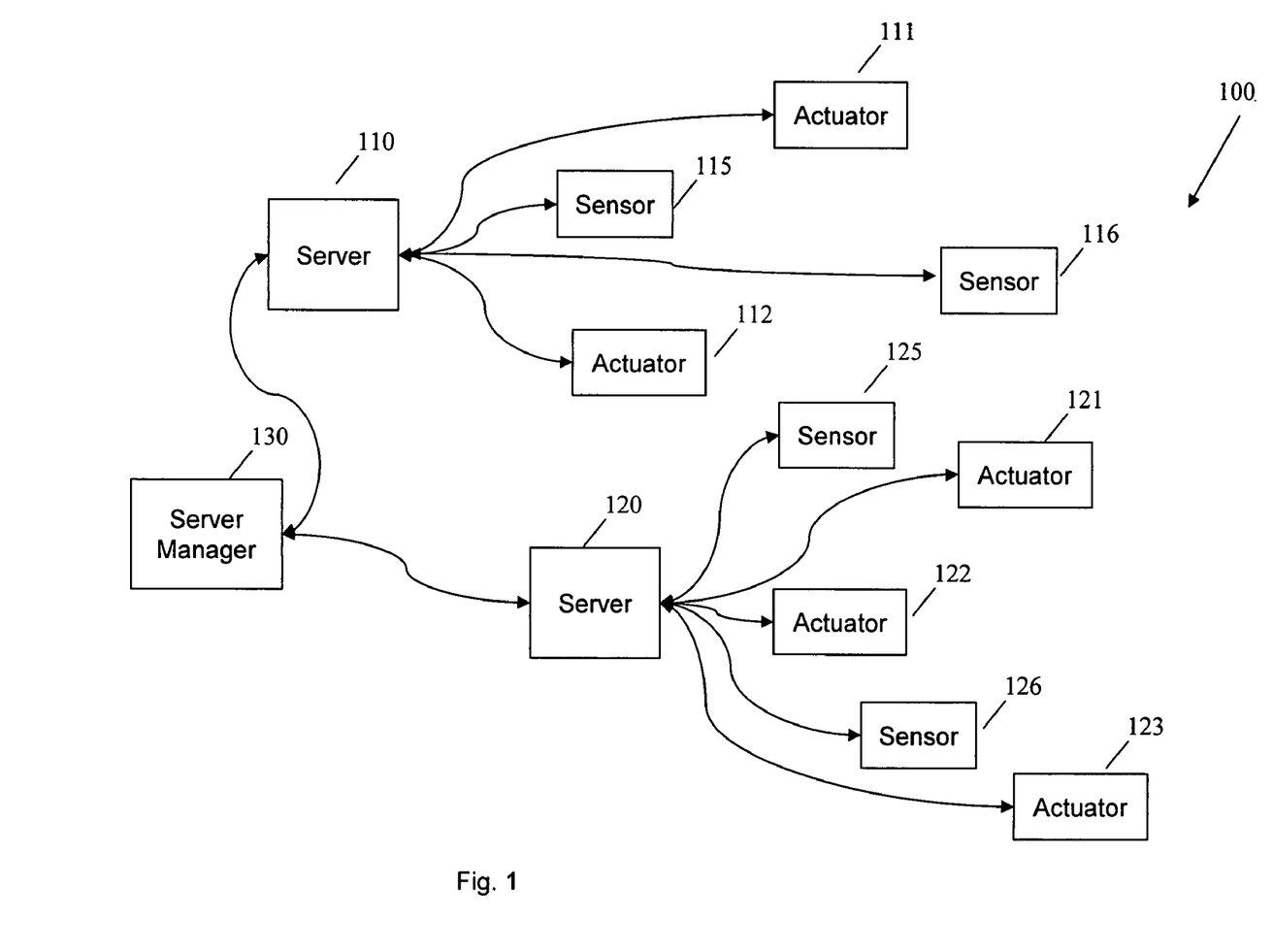
FIG. 1 is a block diagram of an exemplary sensor and actuator (SANet) architecture.

FIG. 1 100 displays an exemplary embodiment of a sensor and actuator network (SANet) architecture. As displayed, a set of sensors 115, 116, 125, 126 and a set of actuators 111, 112, 121, 122, 123 are deployed for sensing data and actuating (enacting commands), respectively. Two servers 110, 120 are used to monitor data collected from sensors and to send commands to actuators. The layout is organized in a distributed fashion so that one server 110 displayed in the exemplary architecture 100 communicates to two sensors 115, 116 and two actuators 111, 112; similarly, the other server 120 displayed in the exemplary architecture 100 communicates with two sensors 125, 126 and three actuators 121, 122, 123. The two servers 110, 120 are coordinated by a server manager 130.

Figure 2:
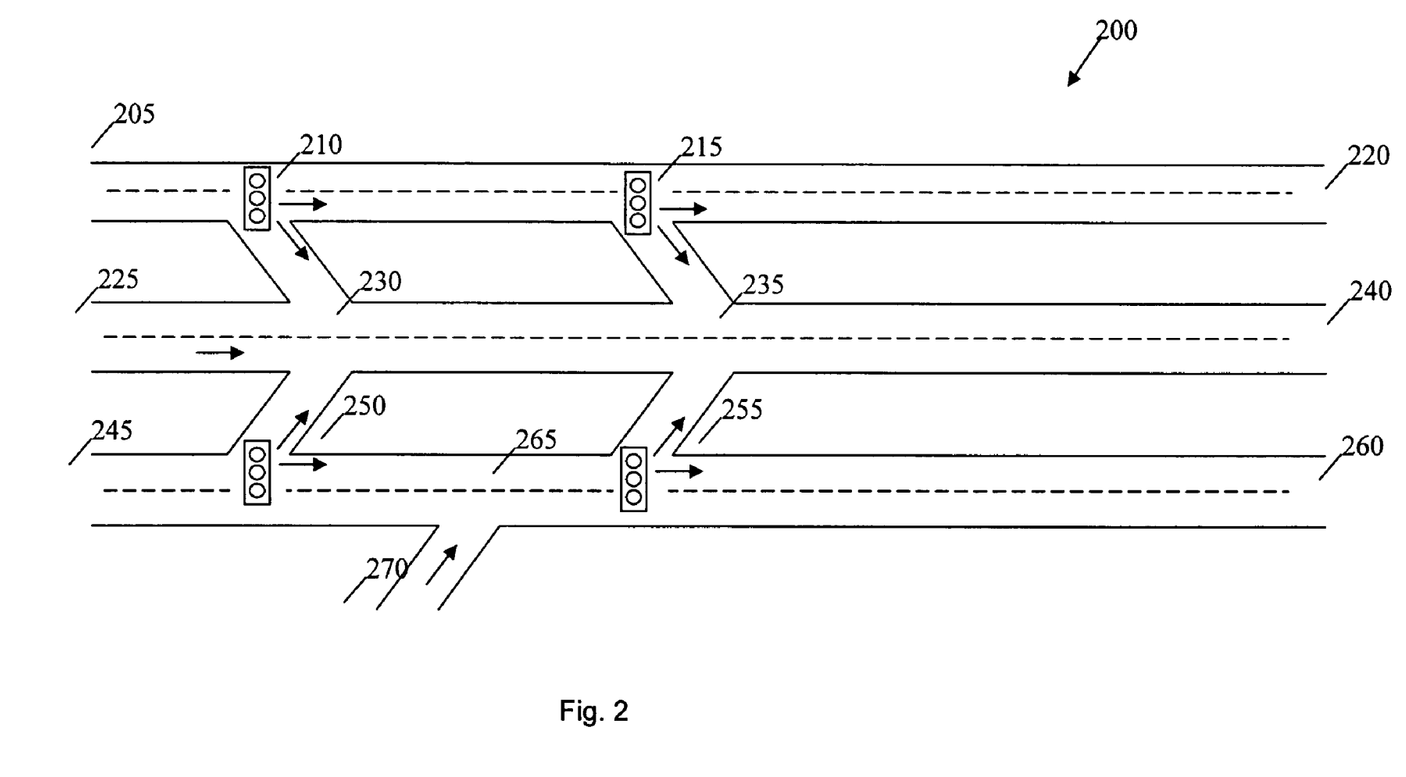
FIG. 2 is an illustration of an exemplary highway topology.

FIG. 2 200 illustrates an exemplary highway topology. The topology consists of a system of roadways that intersect, merge and diverge. Four entrance points 205, 225, 245, 270 are shown where vehicles can enter the system and all vehicle flow moves rightward. There are two types of inflection points: a merge point and a decision point. A merge inflection point involves the merging of two or more road ways into a smaller number of road ways. A decision inflection point involves the diverging of a road way into a larger set of road ways. Seven inflection points 210, 215, 230, 235, 250, 255, 265 are shown in FIG. 2. FIG. 2 shows four decision points 210, 215, 250, 255 with traffic lights depicted to serve as controllers of traffic flow. FIG. 2 shows three merge points 230, 235, 265.

Figure 3:
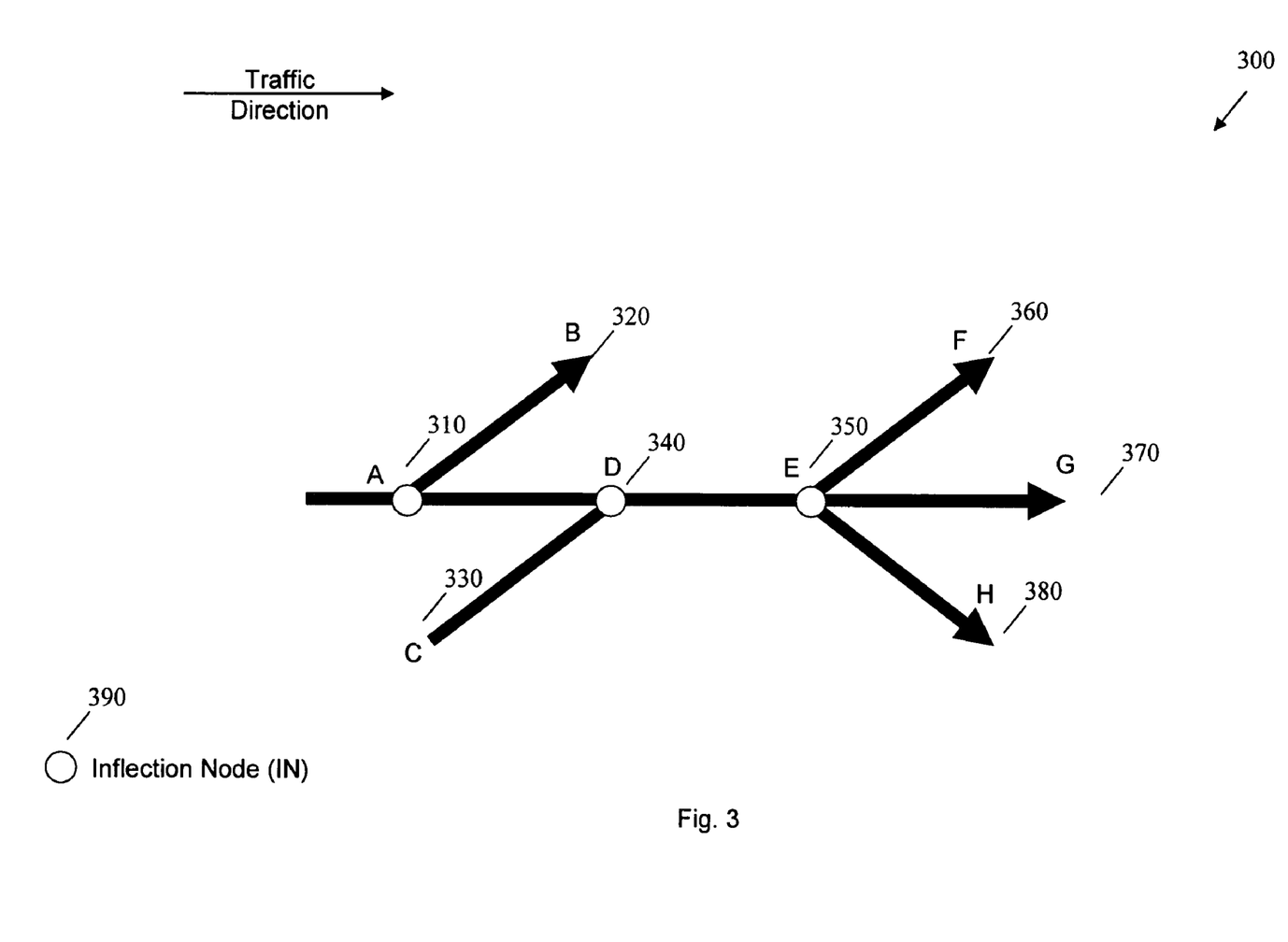
FIG. 3 is an illustration of an exemplary description of the link/node terminology for abstractly describing the components of a highway topology.

FIG. 3 300 illustrates an exemplary abstract representation of the components of a traffic system. Road ways are represented by the black arcs and inflection points are represented by the circular nodes. FIG. 3 displays three inflection points 310, 340 and 350. Point A 310 is a decision point, point D 340 is a merge point and point E is a decision point. As indicated by the arrows, traffic in the exemplary illustration 300 moves rightward. The decision point at A 310 offers a choice for a vehicle to be routed along link AB between points 310 and 320. The merge point D 340 displays the merging of the route AD between points 310 and 340 with the route CD between points 330 and 340. The decision point E offers selection between route DF (between points 350 and 360), route EG (between points 350 and 370) and route EH (between points 350 and 380). Each link has a maximum traffic flow rate as well as an actual traffic flow rate. If the actual traffic flow rate of a given link exceeds (or is projected to exceed) the link's maximum traffic flow rate, then that link is experiencing (or is projected to experience) traffic congestion and traffic is routed away from the congested link(s). For a given inflection point, the total flow rate of all incoming links will equal the total flow rate of all outgoing links. A top inflection point is defined as an inflection point that has no incoming link that is the output of another inflection point. Point A 310 in FIG. 3 is a top inflection point while point D 340 and point E 350 are not top inflection points in the exemplary illustration.

Figure 4:
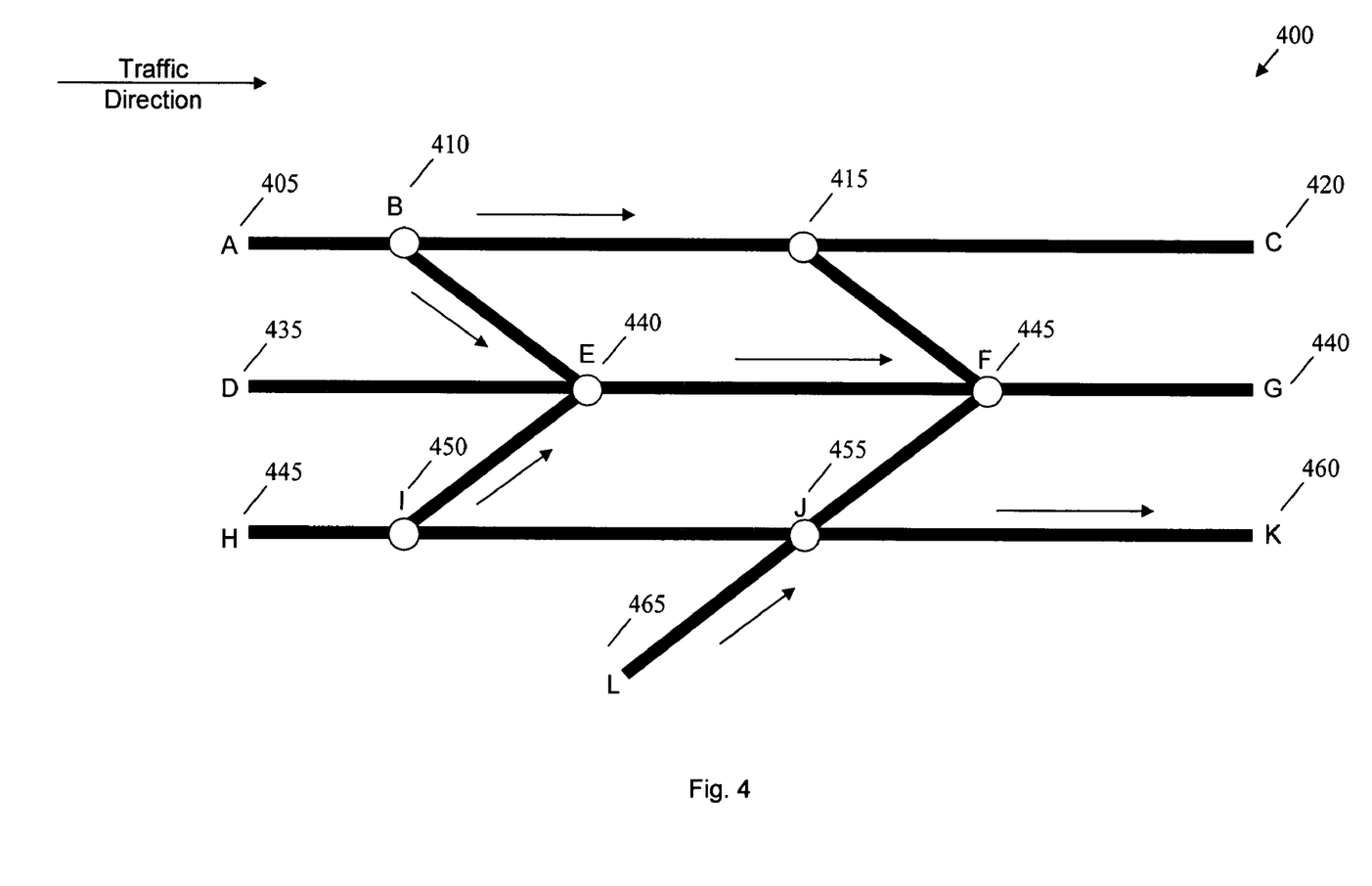
FIG. 4 is an illustration of an exemplary abstract sensor and actuator layout for an exemplary highway topology.

FIG. 4 400 illustrates the application of the exemplary abstract representation discussed in FIG. 3 300 as applied to the exemplary traffic topology of FIG. 2 200. Six inflection points 410, 415, 440, 445, 450, 455 are shown. Four decision points 410, 415, 450, 455 are shown. Two merge points 440, 445 are shown. The entrance points to the highway system are abstractly represented via points A 405, D 435, H 445 and L 465. The exit points are abstractly represented via points C 420, G 440 and K 460. In this exemplary illustration, inflection points B 410 and I 450 are top inflection points.

Figure 5:
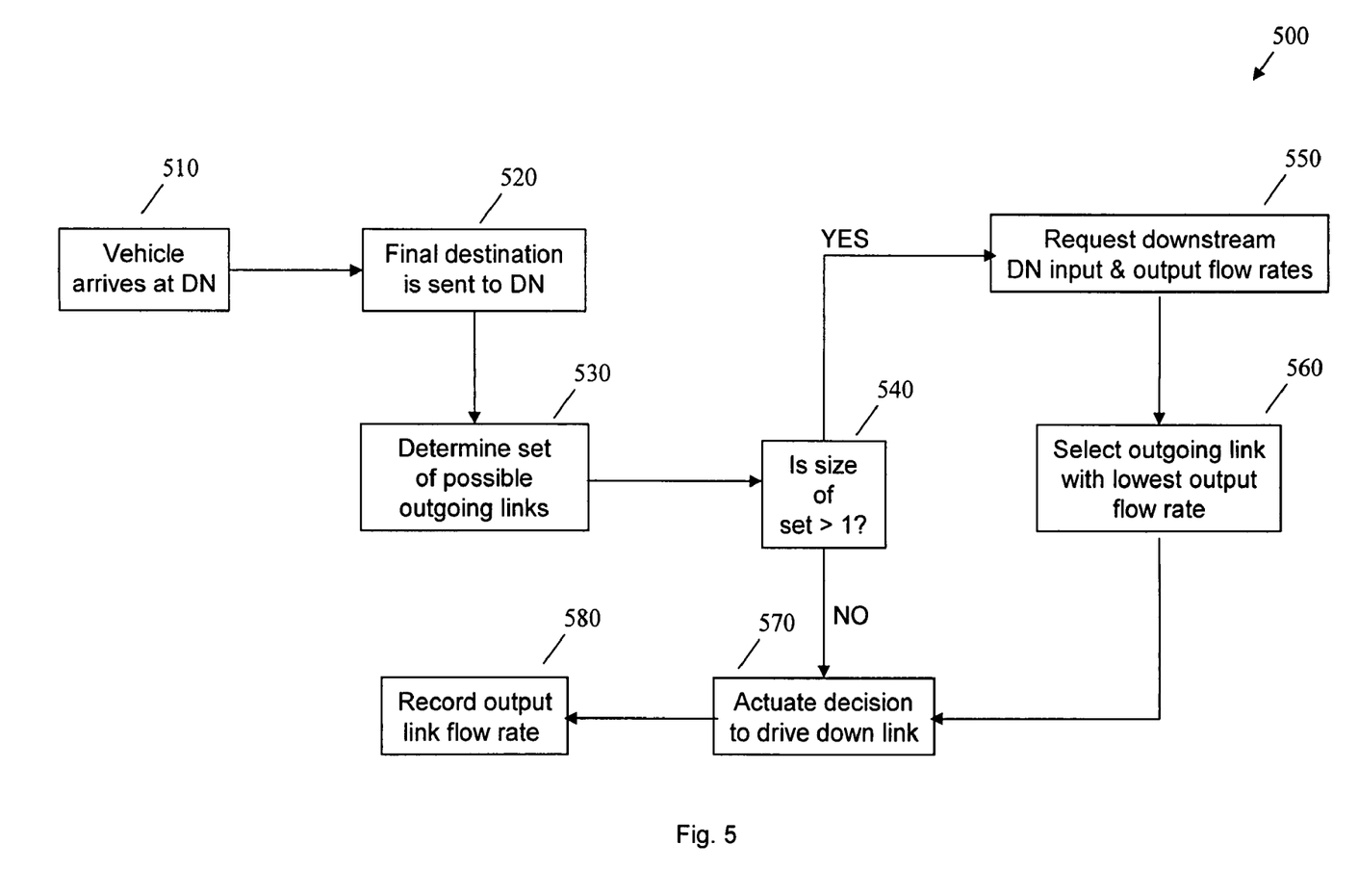
FIG. 5 is a flow diagram illustrating the methodology for using local information to route a vehicle through a highway system.

FIG. 5 shows one possible embodiment of our localized direction-routing scheme. The computation starts in step 510 with the detection of a vehicle at a decision node (DN). When this happens, the final destination of the vehicle or object is sent to the DN, 520. The final destination is selected by the user of the vehicle or by some other user/manager of the transportation system. The DN then determines the set of possible outgoing links, 530. Each of these links corresponds to a path from the current position of the vehicle to its destination. The DN tests if there is more than one outgoing link for this vehicle, 540. If there is more than one outgoing link, the DN evaluates the cost (e.g., in travel time or delay) associated with each of these links by making requests to downstream DNs, asking for input and output flow rates, 550. The DN then selects the link with the lowest cost (e.g., lowest flow rate) 560 and actuates the decision to drive down this link 570. If there is only one link detected in step 540, the execution moves to step 570, where the DN actuates the decision to drive down this link. The execution ends on step 580 with the DN updating and recording the outgoing link flow rate, 580, for future decision that it may have to compute. Thus, after a DN instructs an object or vehicle to use a link, the prediction of vehicle flow rate on that link can be modified to include the new object even before the object begins to traverse the link.

Figure 6:
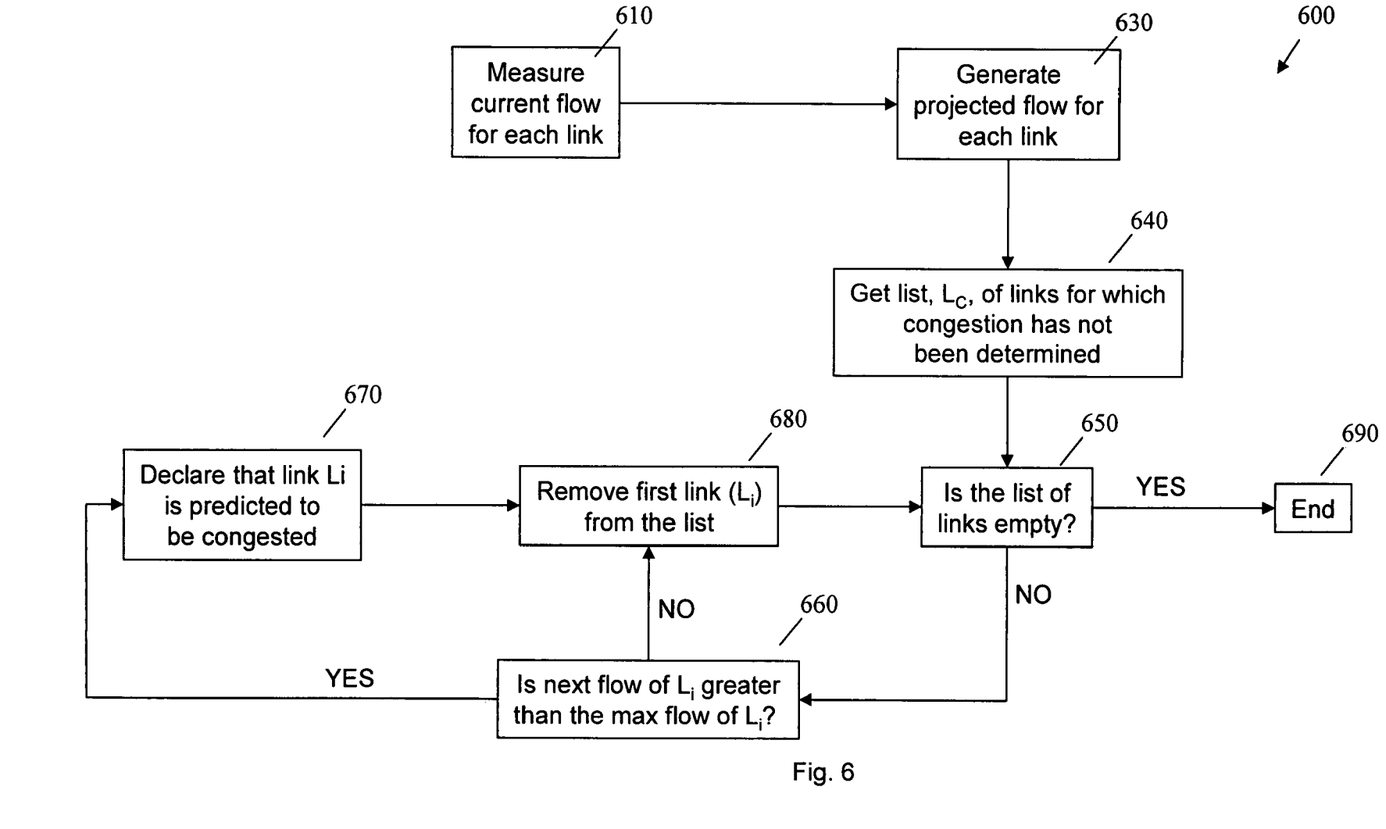
FIG. 6 is a flow diagram illustrating the methodology for predicting traffic congestion of a highway system.

FIG. 6 shows one possible embodiment of our method to predict traffic congestion. The computation starts in step 610 with a measurement of the current flow on each link in the system. Predictions of all these rates are obtained in step 630. The algorithm then retrieves $L_c$, the list of all links with unknown congestion status, 640, and tests if the list is empty, 650. If $L_c$ is not empty, the algorithm picks one link from the list and uses predefined maximum tolerable flows, $I_{max}$, for each link to determine congestion on this link, 660. To determine this congestion, the algorithm compares the projected link flow $I_P$ (obtained in step 630) with the maximum tolerable flow for that link, $I_{max}$. If $I_P$ is greater than $I_{max}$, the algorithm declares the corresponding link to be congested 670. It then removes this link from $L_c$. If $I_P$ is less or equal to $I_{max}$, the computation continues to step 670 with the removal of the link from $L_c$. Once the list becomes empty, the computation ends 690.

Figure 7:
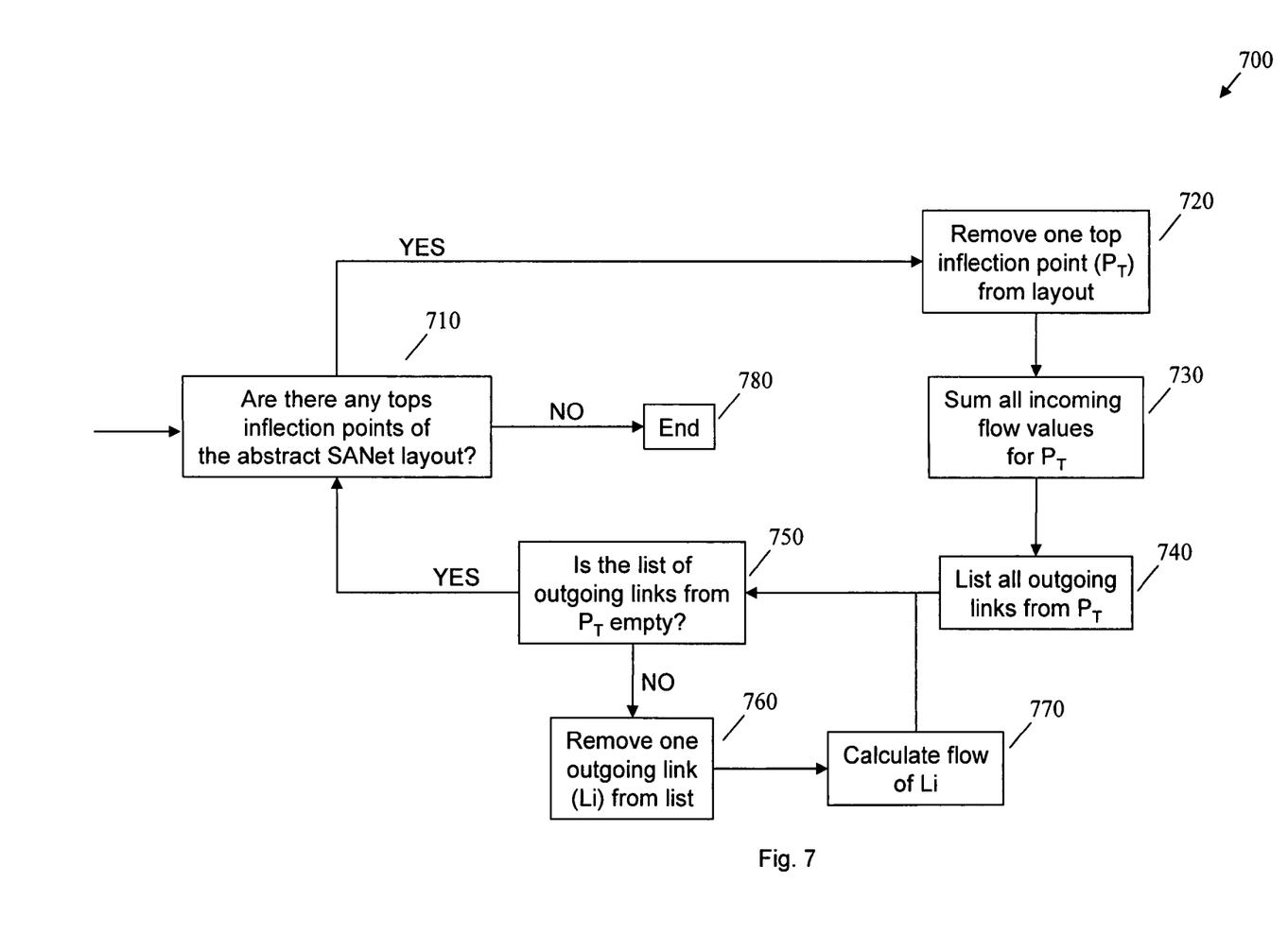
FIG. 7 is a flow diagram illustrating the methodology for generating projected link flow values of a highway system.

FIG. 7 illustrates an exemplary flow diagram for generating projected flow values of links in a traffic system. The algorithm starts 710 by selecting all top inflection points of a given abstract SANet layout and placing them in a list $L_T$. If there are no top points in $L_T$ then the algorithm ends 780. If there are top inflection points, then one top inflection point ($P_T$) is arbitrarily removed 720 from the list. For the selected inflection point $P_T$, the flow rates of all incoming links are summed 730. Then the outgoing links of $P_T$ are placed 740 in the list. The size of the list $L_i$ is checked 750 and if the list is not empty then one outgoing link $L_i$ is removed from the list. The projected flow rate of link $L_i$ is determined from the input flow of $P_T$. Thus, the flow from all incoming links to a node is assigned to all outgoing links using a methodology that most evenly balances traffic flow on the outgoing links. During this balancing process the traffic that is restricted to certain links (cannot reach its desired destination on all outgoing links) is assigned to the restricted links first. Then, the remaining traffic flowing out of the node in question is assigned to the outgoing links. The least used (least congested, lowest flow) link is selected when making each traffic element assignment to balance the use of the outgoing links. After each traffic element is assigned, the flow on each link is recalculated and the next assignment is made to the then least used link. Once all output link flow rates have been determined, then the algorithm is repeated at step 710 by selecting a new top inflection point from the abstract SANet layout. The algorithm recursively propagates flow rates until projected flow values for all links have been determined.

Therefore, as shown above, the invention provides a method of managing traffic flow in a transportation system by creating an abstract representation of the transportation system that includes decision nodes representing intersections of paths within the transportation system and that includes links representing paths between the decision nodes. The method receives current traffic flow rates for each of the links from a plurality of sensors located within the links. From this information the invention predicts future traffic flow rates for each outgoing link of each node based on current traffic flow rates for each incoming link of each the node and based on current traffic flow rates of each the outgoing link.

The invention compares predicted traffic flow rates for each outgoing link of each node to determine which of the outgoing links have the lowest traffic flow rates. This allows the method to route users of the transportation system to outgoing links that have the lowest traffic flow rates. In addition, after a user is routed to a certain link, the method, adds users routed to a link to a predicted traffic flow rate for the link. The method identifies a link as being congested if either of a current traffic flow level or a predicted traffic flow level exceeds a predetermined maximum. This allows the invention to route users of the transportation system away from congested links. Thus, the invention can receive a final destination from a user (an indication of where the user desires the transportation system to take them) and the routing only considers links that will allow the user to reach the final destination.

The traffic management system has the ability to monitor traffic conditions in real-time via an attached group of sensor devices such as roadside sensors, traffic cameras, and in-car speed and position sensors. Other information describing events which may affect traffic (e.g., major sporting events) can be manually entered into the system. The system also has the ability to transmit traffic command instructions (indicating what route or route segment to follow) or decision rule sets (e.g., choose route #1 with probability $p_1$, route #2 with probability $p_2$, etc.) to drivers via in-car navigation devices.

In one embodiment a user will enter a travel destination into a vehicle navigation device. The device will send the source and destination locations to the travel management system. The travel management system will calculate a route for the user based on a group of factors. First, it will consider any current traffic congestion affecting the user's commute from source and destination. Secondly, it will consider any impending traffic flows that will affect the user's commute between the source and destination. The invention performs this step primarily by considering any decisions the system has made or is making to route other vehicles in such a way that could affect the user's impending commute. This is an example of the coordinated decision-making process provided by embodiments herein. Third, the system also incorporates knowledge of other events and predicts any affects on the user's commute (e.g., major sporting and entertainment events). The system calculates a route, or produces rules for locally deciding a route, attempting to avoid the effects of all the previous factors and sends this information back to the user's navigation system. The system will display either the route chosen by the system or a set of routes from which the user may choose. This entire process may repeat as the user commutes along his or her path so that updated decisions are made available.

While the invention has been described in terms of several exemplary embodiments, those skilled in the art will recognize that the invention can be practiced with modification within the spirit and scope of the appended claims. For example, the present invention applies to vehicle highway management systems in which a system of sensors are used to monitor highway traffic, an algorithm is applied to the collected data and corresponding signals are sent to a system of controllers such that each controller resides in an individual car and controls that car's routing decisions. In another embodiment of the present invention, an indoor moving sidewalk used to move pedestrians between indoor locations could be deployed with a network of sensors for monitoring the moving pedestrian traffic and routing decisions could be made using a system of controllers throughout the system. Further, it is noted that, Applicants' intent is to encompass equivalents of all claim elements, even if amended later during prosecution.

What is claimed is:

1. A computer system implemented method of managing traffic flow in a transportation system, said method comprising:

creating, within a computer system, an abstract representation of said transportation system that includes decision nodes representing intersections of paths within said transportation system and that includes links representing paths between said decision nodes, receiving current traffic flow rates for each of said links from a plurality of sensors located within said links;

predicting, using said computer system, future traffic flow rates for each outgoing link of each node based on current traffic flow rates for each incoming link of each said node and based on current traffic flow rates of each said outgoing link;

comparing, using said computer system, predicted traffic flow rates for each said outgoing link of each node to determine which of said outgoing links have the lowest traffic flow rates;

routing, using said computer system, users of said transportation system to outgoing links that have said lowest traffic flow rates by transmitting commands to said users;

after routing said users, adding, using said computer system, users routed to a link to a predicted traffic flow rate for said link;

identifying, using said computer system, a link as being congested if either of a current traffic flow level or a predicted traffic flow level exceeds a predetermined maximum;

routing, using said computer system, users of said transportation system away from congested links by transmitting commands to said users; and receiving a final destination from a user of said transportation system, wherein said routing only considers links that will allow said user to reach said final destination.

2. A method of managing traffic flow in a transportation system, said method comprising:
- creating, within a computer system, an abstract representation of said transportation system that includes decision nodes representing intersections of paths within said transportation system and that includes links representing paths between said decision nodes,
- receiving, using said computer system, current traffic flow rates for each of said links from a plurality of sensors located within said links;
- predicting, using said computer system, future traffic flow rates for each outgoing link of each node based on current traffic flow rates for each incoming link of each said node and based on current traffic flow rates of each said outgoing link;
- comparing, using said computer system, predicted traffic flow rates for each said outgoing link of each node to determine which of said outgoing links have the lowest traffic flow rates;
- routing, using said computer system, users of said transportation system to outgoing links that have said lowest traffic flow rates; and
- after routing said users, adding, using said computer system, users routed to a link to a predicted traffic flow rate for said link.

3. The method according to claim 2, further comprising:
- identifying a link as being congested if either of a current traffic flow level or a predicted traffic flow level exceeds a predetermined maximum; and
- routing users of said transportation system away from congested links.

4. The method according to claim 2, further comprising receiving a final destination from a user of said transportation system, wherein said routing only considers links that will allow said user to reach said final destination.

5. A method of managing vehicle traffic flow in a vehicle transportation system, said method comprising:
- Creating, within a computer system, an abstract representation of said transportation system that includes decision nodes representing intersections of roads within said transportation system and that includes links representing roads between said decision nodes,
- receiving, using said computer system, current vehicle traffic flow rates for each of said links from a plurality of sensors located within said links;
- predicting, using said computer system, future vehicle traffic flow rates for each outgoing link of each node based on current vehicle traffic flow rates for each incoming link of each said node and based on current vehicle traffic flow rates of each said outgoing link;
- comparing, using said computer system, predicted vehicle traffic flow rates for each said outgoing link of each node to determine which of said outgoing links have the lowest vehicle traffic flow rates;
- routing, using said computer system, vehicles of said transportation system to outgoing links that have said lowest vehicle traffic flow rates; and
- after routing said vehicles, adding, using said computer system, vehicles routed to a link to a predicted vehicle traffic flow rate for said link.

6. The method according to claim 5, further comprising:
- identifying a link as being congested if either of a current vehicle traffic flow level or a predicted vehicle traffic flow level exceeds a predetermined maximum; and
- routing vehicles of said transportation system away from congested links.

7. The method according to claim 5, further comprising receiving a final destination from a vehicle of said transportation system, wherein said routing only considers links that will allow said vehicle to reach said final destination.

* * * * *